Sept. 15, 1953        L. D. BANKS        2,652,028
POULTRY WATERING DEVICE
Filed Sept. 21, 1949        2 Sheets-Sheet 1
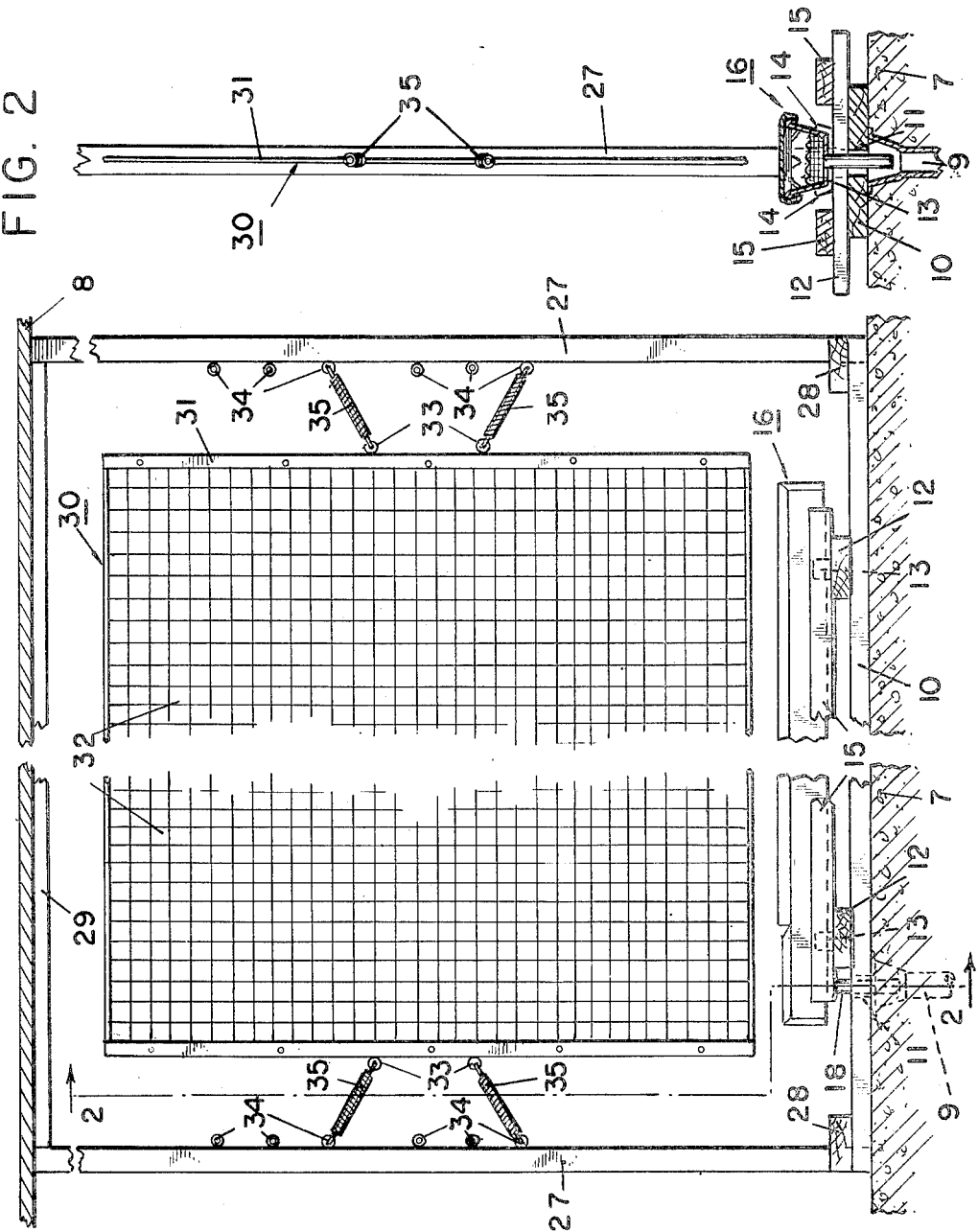
LEON D. BANKS
Inventor
Attorneys Sept. 15, 1953  L. D. BANKS  2,652,028
POULTRY WATERING DEVICE
Filed Sept. 21, 1949  2 Sheets-Sheet 2
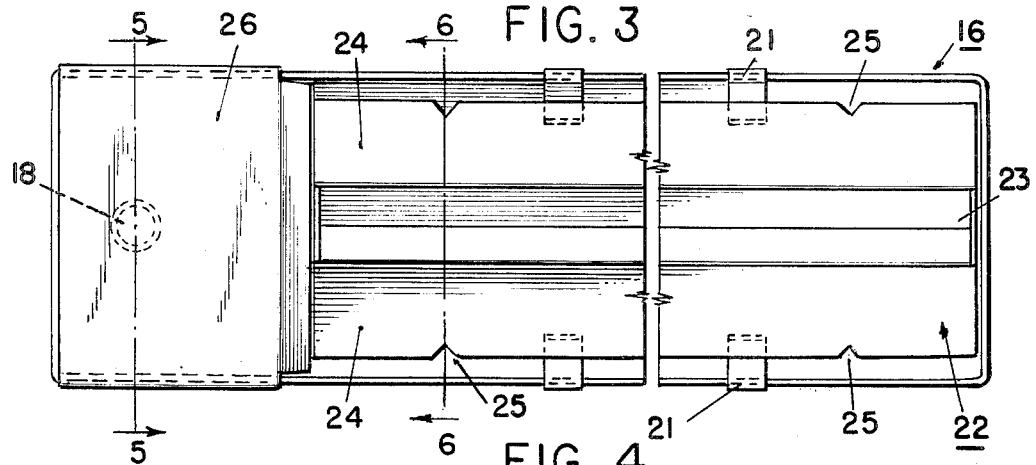
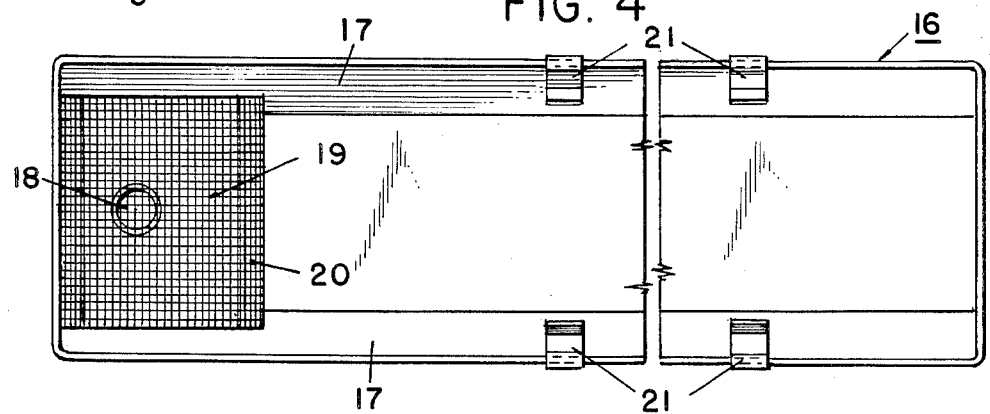
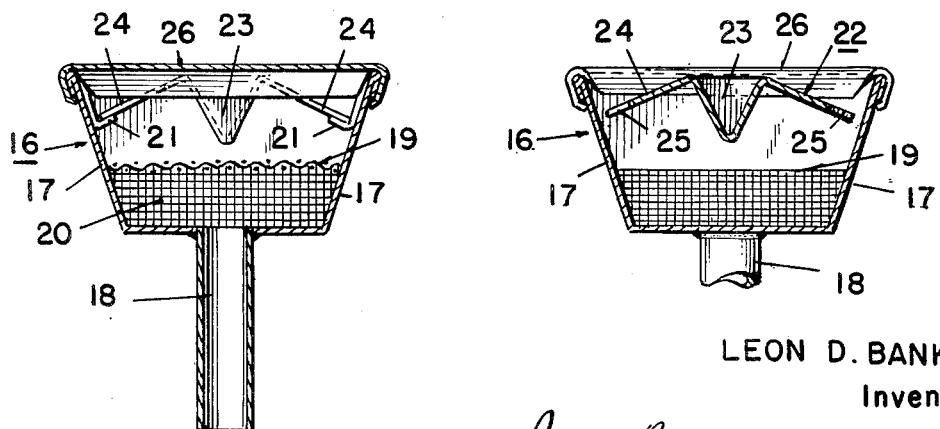
LEON D. BANKS
Inventor
By Mason, Porter, Miller & Stewart
Attorneys Patented Sept. 15, 1953

2,652,028

UNITED STATES PATENT OFFICE 2,652,028

POULTRY WATERING DEVICE

Leon D. Banks, Alpine, N. Y.

Application September 21, 1949, Serial No. 117,041

9 Claims. (Cl. 119—74)

The invention described in detail in the following specification relates to an improved poultry watering device to be used in brooders where large numbers of chicks, aggregating several hundreds, are being raised in one group.

Poultrymen have recognized that although abundant drinking water is essential to the rapid growth of chicks, the latter do not learn to go to established drinking troughs before they are 10 or 12 days old. Before that, it is necessary to place temporary drinking fountains immediately adjacent the brooders. There is a serious problem, however, where the young chicks soil the supply of drinking water and also scatter the water on the ground near the fountains, thus leading to serious losses from disease. These problems increase as the chicks grow in size.

I have discovered that chicks may be trained to use a drinking trough when as young as three or four days old. It is therefore possible to obtain better feeding conditions and quicker growth.

I have also arranged the device in such a fashion that it will be readily adaptable in its proportions to the growing chicks, so that it will be convenient for their use at all times.

Finally, my device has provision for preventing the chicks from perching on the watering facilities or of dropping excreta in the watering pan.

One of the objects of my invention is to provide a poultry watering device which cannot be contaminated by food and litter incidental to its use by the chicks.

Another object of my invention is to make the device substantially self-cleaning of any litter or debris which the chicks may throw into the device while scratching.

A still further object is to provide a readily cleanable equipment which will save a great deal of time for the poultrymen.

Among the objects of my invention is to prevent chicks from perching on the trough. In this way, the chicks are trained not to attempt to use the trough as a perch.

Finally, the device is adaptable for changes in height, so that it will be conveniently arranged for the use of the chick throughout its entire growing period.

As illustrated in the preferred form of the invention, I have shown the device in the accompanying drawings in which Fig. 1 is a fragmentary side elevation of the improved poultry watering device;

Fig. 2 is a partial end view of the same partly in section on line 2—2 of Fig. 1;

Fig. 3 is an enlarged plan view of the watering trough and associated parts;

Fig. 4 is a similar view of the drain pan;

Fig. 5 is a vertical cross-section of the watering trough taken on the line 5—5 of Fig. 3 and Fig. 6 is a similar cross-section taken on the line 6—6 of Fig. 3.

Briefly described, my improved poultry watering device consists of a watering trough which may be of any desired length, limited only by the ability of the tin-smith to fabricate it. The trough is mounted upon a support which permits it to be raised as the chicks grow, and their perches may at the same time be moved away from the trough to train them in its proper use.

In addition, I have provided means to prevent the chicks from perching on the trough, and thus train them not to do so. This insures against soiling the trough.

The device may be mounted directly upon the floor of the brooder house. Preferably, however, I provide a base or platform by means of which the several parts are held in the desired relative positions. Thus in the drawings, Fig. 1 illustrates the floor 7 and the ceiling 8 of the brooder room. The floor has a drain 9 for the overflow from the watering device.

A platform or base 10 made of wood or similar material rests upon the floor 7 and has a hole 11 registering with the drain 9. This base is of advantage in supporting the several parts in desired relative positions.

Cross-bars 12 rest upon the base 10 and are suitably spaced apart. Each bar 12 has a cleat 13 having upturned ends 14, 14. The bars are sufficiently long, as shown in Fig. 2, to support perches 15, 15. These perches may be moved away from the cleats 13 as the chicks increase in size, so that at all times the birds will find it convenient to reach into the center of the drinking device while standing on one of the perches.

The watering device proper consists of a drain pan 16. This pan is formed of sheet metal protected against corrosion by galvanizing or the like. It is of any desired length and may be as long as the tin-smith is able to make it. It has been made as long as 8 feet. The greater the length, the less is the likelihood of crowding by the chicks. This dimension is the one which practically controls the length of the base 10 and the spacing of the cross-bars 12.

The drain pan 16 is relatively narrow compared with its length and has sloping sides 17 as shown in the drawings. One end of the pan 16 has a drain pipe 18. This pipe passes through the hole in the base 10 and registers with the drain 9. As the birds increase in size, and it is desired to raise the cross bars 12, 12, this can be done by inserting blocks, and the pipe 18 will still drain into the drain 9.

The end of the pan 16 above the drain pipe 18 has a screen guard 19. This extends inwardly from one end and between the opposite sloping sides. It also has a downturned end 20 which extends to the bottom of the pan. The function of this screen is to hold debris and prevent it from blocking the drain pipe 18.

The sides of the drain pan have a series of brackets 21, 21. These extend down the inner surfaces of the sides and form supports for the trough proper.

The trough proper 22 is also formed of sheet metal bent in the cross-section indicated in Figs. 5 and 6. Centrally the trough has a channel 23, which in the example is V-shaped in cross-section. The channel is closed at its ends as shown in Fig. 3, so that it may be completely filled with drinking water supplied by an inlet pipe at any convenient point, but which is not illustrated.

The trough has outwardly sloping rims 24, 24. The outer edges of these rims rest upon the brackets 21, 21 and thus support the trough. Fig. 3 illustrates the notches 25 spaced along the outer edges of the rims 24, 24. These notches discharge excess drinking water that spills over from the trough channel 23. They also carry away foot particles and other refuse that may fall upon the rims. This self-cleaning feature is found to be most advantageous, as it reduces the amount of time required by the poultryman in keeping the equipment in serviceable condition.

The trough 22 extends from the downturned end 20 of the screen guard to the opposite end of the pan 16. The space above the screen guard 19 is covered by a removable cover or guard plate 26. This is snapped over the sides of the drain pan and prevents chicks from getting to the trough at this end.

Provision is made for mounting a baffle vertically and centrally over the drinking trough. A pair of upright supports 27, 27 are mounted vertically beyond the ends of the pan 16. As illustrated, they are held by notched footing blocks 28, 28 set in the ends of the platform 10.

The upper ends of the uprights are held spaced apart by means of a top stretcher bar 29. However, where this watering device forms part of a brooder house, the uprights may extend to the ceiling of the room and be fitted tightly in position by frictional engagement against the ceiling, thus dispensing with the need of the spacing bar 29.

A baffle 30 is pivotally suspended from the uprights 27, 27 longitudinally of the pan. In the form shown, this baffle consists of a frame 31 filled with wire mesh fabric 32. Each side of the frame carries a pair of screw eyes 33.

A series of hooks 34, or screw eyes is arranged vertically on each upright 27. A spring 35 is attached to each screw eye 33 and arranged for attachment to the hooks 34. The hooks 34 selected for attachment are such that the springs 35 diverge in the manner illustrated in Fig. 1. It will be observed that by the use of different pairs of hooks 34, the baffle 30 can be given successive vertical positions, thus maintaining the desired spacing of the frame 31 from the pan 16, as the latter is successively raised.

As will be evident from the above description, the device may be assembled as a complete unit which will be self-supporting without reliance upon the ceiling 8. In this respect, the device may be mounted in the open air. The cross-bars 12 selected for minimum height when placed on the base 10 or floor 7, determine the height of the pan which is held in the cleats 13. Drinking water supply, preferably fed constantly to the channel 23, will fill the latter to overflowing, and the excess will drain down the sloping rims 24, 24, rinsing the latter into the pan 16. Suitable drainage prevents the ground from being wet.

As the chicks stand on the perches 15, 15, their feet are kept dry and the perches determine the proper position relative to the drinking channel 23. Any water which the birds pick up on their beaks, but fail to swallow, will fall on the rims or flanges 24 and within the sides 17.

As the birds increase in size, the perches are moved farther from the pan 16 and at the same time, the cross-bars 12 are blocked up. In this way the drinking equipment is always suitably raised from the general level of the brooder floor.

Small chicks are apt to attempt to perch on the edges of the sides 17. Any such attempt will bring the bird's head into contact with the baffle 30. While the baffle may be momentarily displaced, it will spring back like a pendulum under the tension of the springs 35. This strikes the bird and dislodges it from its perch on the side 17.

It has been found that, after a short while the birds recognize that it is impossible to perch on the side 17 and, in fact, ultimately the baffle 30 may be removed without likelihood of the birds attempting to perch on the trough.

By suitably proportioning the trough with respect to the size of the newly hatched chicks it has been found that the chick will form the habit of drinking from the trough by the time it is three or four days old. This is substantially a week in advance of the time when it learns to use a trough by gradual training with temporary drinking vessels.

Easy access to the trough during the period of growth has been found to be materially instrumental in increasing the rate of growth. At the same time, the trough remains in good condition, and a minimum of labor is required to care for it.

The invention has been illustrated and described in its preferred form. However, numerous changes in material, proportions and size may be made without departing from the scope of the invention as defined in the following claims.

What I claim:

1. A poultry watering device having a platform, a pair of spaced crossbars, a drain pan removably held on the crossbars, a perch on the crossbars on each side of the pan and parallel thereto, and a narrow trough removably mounted in the pan in a fixed horizontal position, said trough having deflecting flanges sloping downwardly and outwardly toward the sides of the pan.

2. A poultry watering device having a platform, a pair of spaced crossbars, a drain pan removably held on the crossbars, a perch on the crossbars on each side of the pan and parallel thereto, and a narrow trough removably mounted in the pan in a fixed horizontal position, said trough having deflecting flanges sloping downwardly and outwardly to the sides of the pan, the outer edges of the flanges being notched at spaced intervals.

3. A poultry watering device having a platform, a pair of spaced crossbars, a drain pan removably held on the crossbars, a perch on the crossbars on each side of the pan and parallel thereto, brackets extending inwardly from the sides of the pan, and a narrow trough having a central longitudinal channel and deflecting flanges sloping downwardly and outwardly and resting on the brackets.

4. A poultry watering device having a platform, a pair of spaced crossbars, a drain pan removably held on the crossbars, a perch on the crossbars on each side of the pan and parallel thereto, a drain pipe from the pan, a fixed screen above the drain pipe, a cover over the pan above the screen and a narrow trough V-shaped in cross-section, removably mounted in the pan in a fixed horizontal position between the cover and the opposite end of the pan.

5. A poultry watering device having a platform, a pair of spaced crossbars, a drain pan removably held on the crossbars, a perch on the crossbars on each side of the pan and parallel thereto, a trough in the pan, and a pivotally suspended vertical baffle resiliently supported centrally above the trough and closely adjacent thereto.

6. A poultry watering device having a platform, a pair of spaced crossbars, a drain pan removably held on the crossbars, a perch on the crossbars on each side of the pan and parallel thereto, a trough in the pan, an upright at each end of the platform, means to hold the uprights substantially vertical, a vertical baffle and a pair of springs connecting each end of the baffle under tension to the adjacent upright.

7. A poultry watering device having a platform, a pair of spaced crossbars, a drain pan removably held on the crossbars, a perch on the crossbars on each side of the pan and parallel thereto, a trough in the pan, an upright at each end of the platform, means to hold the uprights substantially vertical, a vertical baffle and a pair of relatively inclined springs arranged one above the other and adjustably connecting each end of the baffle under tension to the adjacent upright.

8. A poultry watering device having a platform, a pair of spaced crossbars, a drain pan removably held on the crossbars, a perch on the crossbars on each side of the pan and parallel thereto, and a narrow trough V-shaped in cross-section removably mounted in fixed horizontal position in the pan, and downwardly and outwardly inclined deflecting flanges on the sides of the trough extending close to the sides of the pan.

9. A poultry supplying device having a platform, a pair of spaced crossbars, a refuse receiver removably held on the crossbars, a perch on the crossbars on each side of the receiver and parallel thereto, a trough removably mounted in fixed horizontal position in the receiver and a pivotally mounted vertical baffle resiliently supported centrally above the trough and closely adjacent thereto.

LEON D. BANKS.

References Cited in the file of this patent

UNITED STATES PATENTS

| Number | Name | Date |
|---|---|---|
| 989,282 | Parks | Apr. 11, 1911 |
| 1,481,365 | Hegel | Jan. 22, 1924 |
| 1,603,198 | Edington | Oct. 12, 1926 |
| 1,798,769 | Ward | Mar. 31, 1931 |
| 1,811,375 | Wysong | June 23, 1931 |
| 2,165,753 | Hobbs | July 11, 1939 |
| 2,518,950 | Smith | Aug. 15, 1950 |

FOREIGN PATENTS

| Number | Country | Date |
|---|---|---|
| 257,992 | Great Britain | Sept. 9, 1926 |